US010650548B1

(12) United States Patent
Kim et al.

(10) Patent No.: US 10,650,548 B1
(45) Date of Patent: May 12, 2020

(54) METHOD AND DEVICE FOR LOCALIZATION OF AUTONOMOUS VEHICLE FOR ROUTE PLANNING BY USING ATTENTION-DRIVEN LANDMARK DETECTION

(71) Applicant: STRADVISION, INC., Pohang-si (KR)

(72) Inventors: Kye-Hyeon Kim, Seoul (KR);
Yongjoong Kim, Pohang-si (KR);
Hak-Kyoung Kim, Pohang-si (KR);
Woonhyun Nam, Pohang-si (KR);
SukHoon Boo, Anyang-si (KR);
Myungchul Sung, Pohang-si (KR);
Dongsoo Shin, Suwon-si (KR);
Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang-si (KR)

( * ) Notice: Subject to any disclaimer, the term of this patent is extended or adjusted under 35 U.S.C. 154(b) by 0 days.

(21) Appl. No.: 16/731,093

(22) Filed: Dec. 31, 2019

Related U.S. Application Data

(60) Provisional application No. 62/798,574, filed on Jan. 30, 2019.

(51) Int. Cl.
*G06K 9/00* (2006.01)
*G06T 7/73* (2017.01)
(Continued)

(52) U.S. Cl.
CPC ............ *G06T 7/73* (2017.01); *G01C 21/3602* (2013.01); *G06N 3/0454* (2013.01); *G06N 3/084* (2013.01);
(Continued)

(58) Field of Classification Search
CPC ............ G06T 7/73; G06T 2207/30252; G06T 2207/20084; G06T 2207/20081; G01C 21/3602; G06N 3/084; G06N 3/0454
See application file for complete search history.

(56) References Cited

U.S. PATENT DOCUMENTS

9,046,364 B2 * 6/2015 Kojo ........................ G01S 11/12
10,268,908 B2 * 4/2019 Park ................... G06K 9/00805
(Continued)

*Primary Examiner* — Shefali D Goradia
(74) *Attorney, Agent, or Firm* — Xsensus LLP (57) ABSTRACT

A method for detecting a location of a subject vehicle capable of an autonomous driving by using a landmark detection. And the method includes steps of: (a) a computing device, if a live feature map is acquired, detecting each of feature map coordinates on the live feature map per each of reference objects included in a subject data region corresponding to a location and a posture of the subject vehicle, by referring to (i) reference feature maps corresponding to the reference objects, and (ii) the live feature map; (b) the computing device detecting image coordinates of the reference objects on a live image by referring to the feature map coordinates; and (c) the computing device detecting an optimized subject coordinate of the subject vehicle by referring to 3-dimensional coordinates of the reference objects in a real world.

20 Claims, 5 Drawing Sheets

(51) Int. Cl.
*G01C 21/36* (2006.01)
*G06N 3/04* (2006.01)
*G06N 3/08* (2006.01)

(52) U.S. Cl.
CPC ............... *G06T 2207/20081* (2013.01); *G06T 2207/20084* (2013.01); *G06T 2207/30252* (2013.01)

(56) References Cited

U.S. PATENT DOCUMENTS

| | | | |
|---|---|---|---|
| 10,358,104 B2 * | 7/2019 | Chen | B60R 21/16 |
| 10,509,947 B1 * | 12/2019 | Douillard | G06T 3/0037 |
| 2008/0012938 A1 * | 1/2008 | Kubota | B60Q 9/008 |
| | | | 348/118 |
| 2008/0036580 A1 * | 2/2008 | Breed | B60J 7/0573 |
| | | | 340/438 |
| 2013/0182906 A1 * | 7/2013 | Kojo | G01S 11/12 |
| | | | 382/103 |
| 2018/0074494 A1 * | 3/2018 | Myers | H04W 4/029 |
| 2018/0131924 A1 * | 5/2018 | Jung | H04N 13/204 |
| 2019/0257659 A1 * | 8/2019 | Moteki | G09B 29/00 |

\* cited by examiner

METHOD AND DEVICE FOR LOCALIZATION OF AUTONOMOUS VEHICLE FOR ROUTE PLANNING BY USING ATTENTION-DRIVEN LANDMARK DETECTION

CROSS REFERENCE OF RELATED APPLICATION

This present application claims the benefit of the earlier filing date of provisional patent application No. 62/798,574, filed Jan. 30, 2019, the entire contents of which being incorporated herein by reference.

FIELD OF THE DISCLOSURE

The present disclosure relates to a method and a device for use with an autonomous vehicle; and more particularly, to the method and the device for acquiring location information of an autonomous vehicle by using an attention-driven landmark detection to be used for a route planning.

BACKGROUND OF THE DISCLOSURE

In a field of autonomous driving, it is very important to determine a precise location of an autonomous vehicle, which is necessary for a planning of the autonomous driving. However, a GPS used to localize the autonomous vehicle is not precise enough to be used for the planning, resulting in an inaccuracy of the route planning.

A conventional approach to overcome this obstacle shown above is to directly correct location information acquired through the GPS. However, this approach also has a problem in that it may require huge amount of computing powers, resulting in a lack of computing powers to be used for the autonomous driving.

SUMMARY OF THE DISCLOSURE

It is an object of the present disclosure to solve all the aforementioned problems.

It is another object of the present disclosure to provide a method for acquiring location information of an autonomous vehicle by using an attention-driven landmark detection to be used for a route planning to thereby support a more accurate autonomous driving.

It is still another object of the present disclosure to provide a method for detecting the location information of the autonomous vehicle by referring to information on location information of reference objects based on a live image and another location information of the reference objects in a real world.

It is still yet another object of the present disclosure to provide a Convolutional Neural Network (CNN) capable of detecting location information of the reference objects on a live feature map corresponding to the live image.

It is still yet another object of the present disclosure to provide another CNN capable of detecting location information of the reference objects on the live image.

In accordance with one aspect of the present disclosure, there is provided a method for detecting a location of a subject vehicle capable of an autonomous driving by using a landmark detection, including steps of: (a) a computing device, if at least one live feature map, which has been generated by processing at least one live image corresponding to a circumstance of the subject vehicle interworking with the computing device, is acquired, detecting each of feature map coordinates on the live feature map per each of one or more reference objects included in a subject data region corresponding to at least one location and at least one posture of the subject vehicle by which the live feature map has been acquired, by referring to (i) each of one or more reference feature maps corresponding to each of the reference objects, and (ii) the live feature map; (b) the computing device detecting each of image coordinates of each of the reference objects on the live image by referring to each of the feature map coordinates; and (c) the computing device detecting at least one optimized subject coordinate of the subject vehicle by referring to one or more 3-dimensional coordinates of the reference objects in a real world, the image coordinates, information on parameters of a camera which has acquired the live image, and information on said posture of the subject vehicle.

As one example, at the step of (c), the computing device detects the optimized subject coordinate by using a following formula, along with the image coordinates, the 3-dimensional coordinates, the information on the parameters and the information on the posture:

$$\min_{\theta,R,Z} \left\| \begin{bmatrix} [p_1]_1 & \cdots & [p_n]_1 \\ [p_1]_2 & \cdots & [p_n]_2 \\ 1 & \cdots & 1 \end{bmatrix} \begin{bmatrix} z_1 & 0 & 0 \\ 0 & \ddots & 0 \\ 0 & 0 & z_n \end{bmatrix} - K \times R(\theta) \left( \begin{bmatrix} [q_1]_1 & \cdots & [q_n]_1 \\ [q_1]_2 & \cdots & [q_n]_2 \\ [q_1]_3 & \cdots & [q_n]_3 \end{bmatrix} - \begin{bmatrix} r_1 & \cdots & r_1 \\ r_2 & \cdots & r_2 \\ r_3 & \cdots & r_3 \end{bmatrix} \right) \right\|$$

wherein $[p_j]_k$ denotes a k-th axis component of a j-th image coordinate of a j-th reference object, $[q_j]_k$ denotes a k-th axis component of a j-th 3-dimensional coordinate of the j-th reference object, $r_k$ denotes a k-th axis component of the optimized subject coordinate, $z_k$ denotes a k-th diagonal component of a diagonal matrix including arbitrary numbers as its diagonal components, K denotes a camera matrix corresponding to the parameters of the camera, $R(\theta)$ denotes a rotation matrix corresponding to the posture of the subject vehicle.

As one example, at the step of (c), the computing device detects the optimized subject coordinate by solving an optimization problem corresponding to said formula, wherein the computing device (i) first performs (i-1) a process of initializing the rotation matrix by referring to the information on the posture which has been acquired through at least one gyro sensor in the subject vehicle, to thereby generate an initialized rotation matrix, and (i-2) a process of initializing a subject coordinate matrix, to be used for acquiring the optimized subject coordinate, by referring to an initial subject coordinate acquired through a Global Positioning System (GPS) in the subject vehicle, to thereby generate an initialized subject coordinate matrix, (ii) then performs a process of initializing the diagonal matrix by finding an initialized diagonal matrix which minimizes said formula on condition that the initialized rotation matrix and the initialized subject coordinate matrix are provided, and (iii) finally performs a process of finding an optimized rotation matrix, an optimized subject coordinate matrix and an optimized diagonal matrix which minimize said formula by adjusting values of the initialized rotation matrix, the initialized subject coordinate matrix and the initialized diagonal matrix, to thereby solve the optimization problem, and then to thereby find the optimized subject coordinate by referring to the optimized subject coordinate matrix.

As one example, at the step of (a), the computing device, if a specific integrated feature map, which has been generated by channel-wise concatenating (i) a plurality of a specific reference feature map with a size of $W_2 \times H_2 \times C_2$, corresponding to a specific reference object and (ii) the live feature map with a size of $W_1 \times H_1 \times C_1$ in parallel, is acquired, instructs a first Convolutional Neural Network (CNN) to apply at least one first CNN operation to the specific integrated feature map, to thereby find a specific partial live feature map, among partial live feature maps in the live feature map, whose similarity score in relation to the specific reference feature map is larger than a threshold, and then to thereby detect a specific feature map coordinate among the feature map coordinates by referring to information on a relative location of the specific partial live feature map in the live feature map.

As one example, the first CNN has been trained before applying the first CNN operation to the specific integrated feature map, wherein the first CNN has performed (i) a process of applying the first CNN operation to an integrated feature map for training to generate each of one or more estimated similarity scores between each of one or more partial live feature maps for training in the live feature map for training and a reference feature map for training, and (ii) a process of generating a first loss by referring to the estimated similarity scores and their corresponding Ground-Truth (GT) similarity scores, and performing backpropagation by using the first loss.

As one example, at the step of (b), the computing device (i) detects a specific sub-region coordinate of a specific reference object on a specific sub-region, corresponding to a specific feature map coordinate, in the live image by referring to a specific partial integrated feature map, which has been generated by integrating (i-1) a specific partial live feature map corresponding to the specific feature map coordinate and (i-2) a specific reference feature map corresponding thereto, and (ii) detects a specific image coordinate among the image coordinates by referring to the specific sub-region coordinate and the specific feature map coordinate.

As one example, at the step of (b), the computing device instructs a second CNN to apply at least one second CNN operation, whose activation function is a tangent hyperbolic operation, to the specific partial integrated feature map, to thereby detect the specific sub-region coordinate.

As one example, the second CNN has been trained before applying the second CNN operation to the specific partial integrated feature map, wherein the second CNN has performed (i) a process of applying the second CNN operation to partial integrated feature maps for training to generate estimated sub-region coordinates for training of reference objects for training corresponding to the partial integrated feature maps for training, and (ii) a process of generating a second loss by referring to the estimated sub-region coordinates and their corresponding Ground-Truth sub-region coordinates, and performing backpropagation by using the second loss.

As one example, at the step of (a), after the live image is acquired through the camera in the subject vehicle, the live image is delivered to an autonomous driving module to generate the live feature map while the autonomous driving module performs an autonomous driving of the subject vehicle, and then the live feature map is delivered to the computing device.

As one example, at the step of (a), the computing device transmits a query to a High-Density (HD) Map by using an initial subject coordinate acquired through a GPS in the subject vehicle and the information on the posture of the subject vehicle, to thereby acquire information on the subject data region including the reference feature maps.

In accordance with another aspect of the present disclosure, there is provided a device for detecting a location of a subject vehicle capable of an autonomous driving by using a landmark detection, including: at least one memory that stores instructions; and at least one processor configured to execute the instructions to perform processes of: (I) if at least one live feature map, which has been generated by processing at least one live image corresponding to a circumstance of the subject vehicle interworking with the computing device, is acquired, detecting each of feature map coordinates on the live feature map per each of one or more reference objects included in a subject data region corresponding to at least one location and at least one posture of the subject vehicle by which the live feature map has been acquired, by referring to (i) each of one or more reference feature maps corresponding to each of the reference objects, and (ii) the live feature map; (II) detecting each of image coordinates of each of the reference objects on the live image by referring to each of the feature map coordinates; and (III) detecting at least one optimized subject coordinate of the subject vehicle by referring to one or more 3-dimensional coordinates of the reference objects in a real world, the image coordinates, information on parameters of a camera which has acquired the live image, and information on said posture of the subject vehicle.

As one example, at the process of (III), the processor detects the optimized subject coordinate by using a following formula, along with the image coordinates, the 3-dimensional coordinates, the information on the parameters and the information on the posture:

$$\min_{\theta, R, Z} \left\| \begin{bmatrix} [p_1]_1 & \cdots & [p_n]_1 \\ [p_1]_2 & \cdots & [p_n]_2 \\ 1 & \cdots & 1 \end{bmatrix} \begin{bmatrix} z_1 & 0 & 0 \\ 0 & \ddots & 0 \\ 0 & 0 & z_n \end{bmatrix} - K \times R(\theta) \left( \begin{bmatrix} [q_1]_1 & \cdots & [q_n]_1 \\ [q_1]_2 & \cdots & [q_n]_2 \\ [q_1]_3 & \cdots & [q_n]_3 \end{bmatrix} - \begin{bmatrix} r_1 & \cdots & r_1 \\ r_2 & \cdots & r_2 \\ r_3 & \cdots & r_3 \end{bmatrix} \right) \right\|$$

wherein $[p_j]_k$ denotes a k-th axis component of a j-th image coordinate of a j-th reference object, $[q_j]_k$ denotes a k-th axis component of a j-th 3-dimensional coordinate of the j-th reference object, $r_k$ denotes a k-th axis component of the optimized subject coordinate, $z_k$ denotes a k-th diagonal component of a diagonal matrix including arbitrary numbers as its diagonal components, K denotes a camera matrix corresponding to the parameters of the camera, $R(\theta)$ denotes a rotation matrix corresponding to the posture of the subject vehicle.

As one example, at the process of (III), the processor detects the optimized subject coordinate by solving an optimization problem corresponding to said formula, wherein the processor (i) first performs (i-1) a process of initializing the rotation matrix by referring to the information on the posture which has been acquired through at least one gyro sensor in the subject vehicle, to thereby generate an initialized rotation matrix, and (i-2) a process of initializing a subject coordinate matrix, to be used for acquiring the optimized subject coordinate, by referring to an initial subject coordinate acquired through a Global Positioning System (GPS) in the subject vehicle, to thereby generate an initialized subject coordinate matrix, (ii) then performs a process of initializing the diagonal matrix by finding an initialized diagonal matrix which minimizes said formula on condition that the initialized rotation matrix and the initialized subject coordinate matrix are provided, and (iii) finally performs a process of finding an optimized rotation matrix, an optimized subject coordinate matrix and an optimized diagonal matrix which minimize said formula by adjusting values of the initialized rotation matrix, the initialized subject coordinate matrix and the initialized diagonal matrix, to thereby solve the optimization problem, and then to thereby find the optimized subject coordinate by referring to the optimized subject coordinate matrix.

As one example, at the process of (I), the processor, if a specific integrated feature map, which has been generated by channel-wise concatenating (i) a plurality of a specific reference feature map with a size of $W_2 \times H_2 \times C_2$, corresponding to a specific reference object and (ii) the live feature map with a size of $W_1 \times H_1 \times C_1$ in parallel, is acquired, instructs a first Convolutional Neural Network (CNN) to apply at least one first CNN operation to the specific integrated feature map, to thereby find a specific partial live feature map, among partial live feature maps in the live feature map, whose similarity score in relation to the specific reference feature map is larger than a threshold, and then to thereby detect a specific feature map coordinate among the feature map coordinates by referring to information on a relative location of the specific partial live feature map in the live feature map.

As one example, the first CNN has been trained before applying the first CNN operation to the specific integrated feature map, wherein the first CNN has performed (i) a process of applying the first CNN operation to an integrated feature map for training to generate each of one or more estimated similarity scores between each of one or more partial live feature maps for training in the live feature map for training and a reference feature map for training, and (ii) a process of generating a first loss by referring to the estimated similarity scores and their corresponding Ground-Truth (GT) similarity scores, and performing backpropagation by using the first loss.

As one example, the processor (i) detects a specific sub-region coordinate of a specific reference object on a specific sub-region, corresponding to a specific feature map coordinate, in the live image by referring to a specific partial integrated feature map, which has been generated by integrating (i-1) a specific partial live feature map corresponding to the specific feature map coordinate and (i-2) a specific reference feature map corresponding thereto, and (ii) detects a specific image coordinate among the image coordinates by referring to the specific sub-region coordinate and the specific feature map coordinate.

As one example, the processor instructs a second CNN to apply at least one second CNN operation, whose activation function is a tangent hyperbolic operation, to the specific partial integrated feature map, to thereby detect the specific sub-region coordinate.

As one example, the second CNN has been trained before applying the second CNN operation to the specific partial integrated feature map, wherein the second CNN has performed (i) a process of applying the second CNN operation to partial integrated feature maps for training to generate estimated sub-region coordinates for training of reference objects for training, and (ii) a process of generating a second loss by referring to the estimated sub-region coordinates and their corresponding Ground-Truth sub-region coordinates, and performing backpropagation by using the second loss.

As one example, at the process of (I), after the live image is acquired through the camera in the subject vehicle, the live image is delivered to an autonomous driving module to generate the live feature map while the autonomous driving module performs an autonomous driving of the subject vehicle, and then the live feature map is delivered to the computing device.

As one example, at the process of (I), the processor transmits a query to a High-Density (HD) Map by using an initial subject coordinate acquired through a GPS in the subject vehicle and the information on the posture of the subject vehicle, to thereby acquire information on the subject data region including the reference feature maps.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

Figure 1:
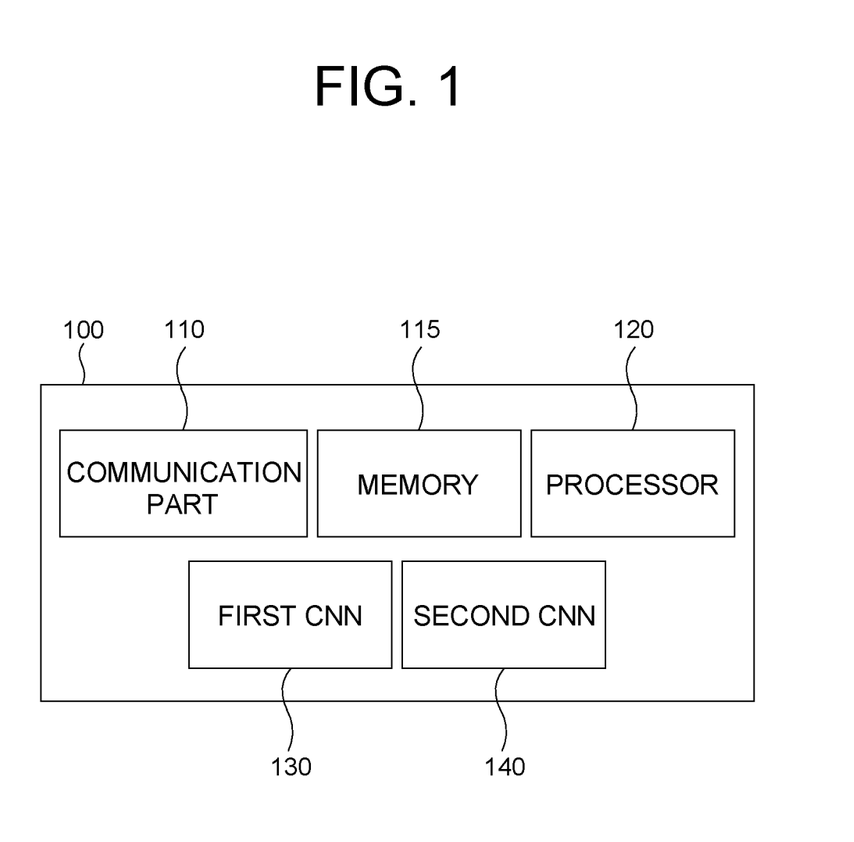
FIG. 1 is a drawing schematically illustrating a configuration of a computing device performing a method for acquiring location information of an autonomous vehicle by using an attention-driven landmark detection to be used for a route planning in accordance with one example embodiment of the present disclosure.

FIG. 1 is a drawing schematically illustrating a configuration of a computing device performing a method for acquiring location information of an autonomous vehicle by using an attention-driven landmark detection to be used for a route planning in accordance with one example embodiment of the present disclosure.

By referring to FIG. 1, the computing device 100 may include a first Convolutional Neural Network (CNN) 130 and a second CNN 140 to be described later. Processes of input/output and computations of the first CNN 130 and the second CNN 140 may be respectively performed by at least one communication part 110 and at least one processor 120. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the computing device 100 does not exclude an integrated device including any combination of a processor, a memory, a medium, or any other computing components.

Hereinafter, the method for acquiring the location information of the autonomous vehicle by using the attention-driven landmark detection to be used for the route planning in accordance with one example embodiment of the present disclosure to be performed by such computing device 100 will be explained. To explain the method briefly, FIG. 2 will be referred to.

Figure 2:
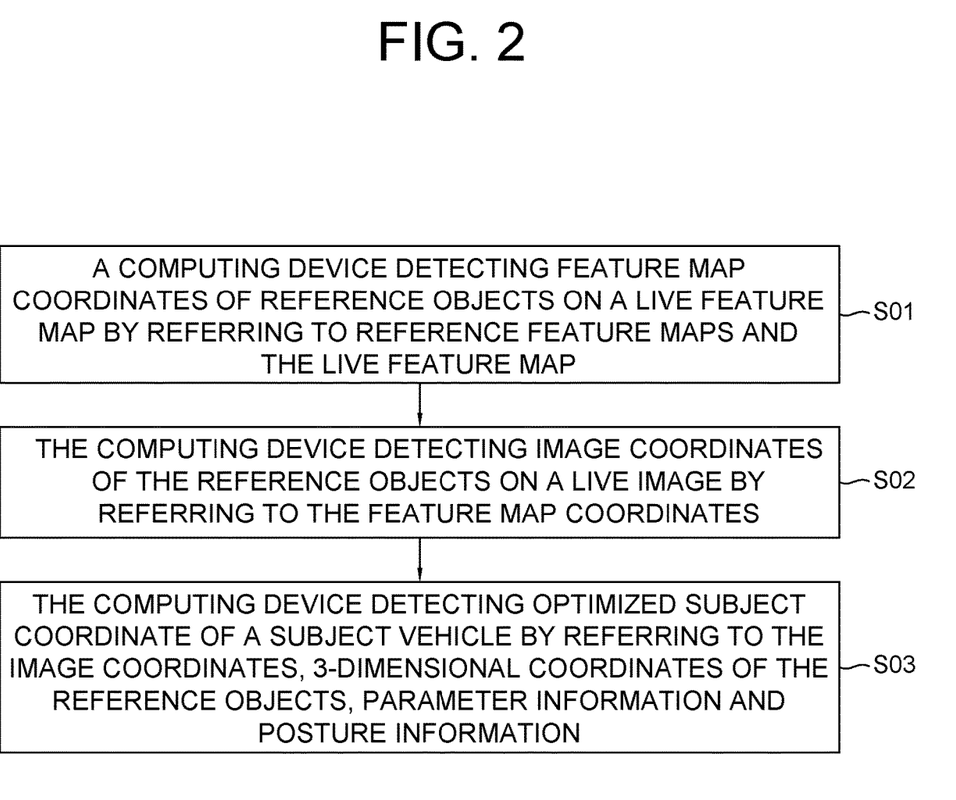
FIG. 2 is a drawing schematically illustrating a flow of the method for acquiring the location information of the autonomous vehicle by using the attention-driven landmark detection to be used for the route planning in accordance with one example embodiment of the present disclosure.

FIG. 2 is a drawing schematically illustrating a flow of the method for acquiring the location information of the autonomous vehicle by using the attention-driven landmark detection to be used for the route planning in accordance with one example embodiment of the present disclosure.

By referring to FIG. 2, at a step of S01, the computing device 100 may detect each of one or more feature map coordinates on at least one live feature map per each of one or more reference objects by referring to each of one or more reference feature maps corresponding to said each of the reference objects and the live feature map to be explained later. And, at a step of S02, the computing device 100 may detect each of image coordinates of each of the reference objects on a live image by referring to each of the feature map coordinates. Thereafter, at a step of S03, the computing device 100 may detect an optimized subject coordinate of the subject vehicle by referring to one or more 3-dimensional coordinates of the reference objects in a real world, the image coordinates, information on parameters of a camera which has acquired the live image, and information on a posture of the subject vehicle. Below, it will be explained more specifically.

First, the computing device 100 may acquire the live feature map. The live feature map may have been generated by processing the live image corresponding to a circumstance of the subject vehicle interworking with the computing device 100. As an example, the live image may have been acquired by the camera in the subject vehicle, and may have been delivered first to an autonomous driving module which performs an autonomous driving of the subject vehicle. The autonomous driving module may perform an image segmentation or an object detection by using the live image, in order to perform the autonomous driving based on image processing. As a byproduct of such autonomous driving, the live feature may have been generated by the autonomous driving module. After it has been generated, it may be delivered to the computing device 100. In this case, since the byproduct, i.e., the live feature map, is reused, it may efficient in a usage of computing resources.

Also, the computing device 100 may acquire the reference feature maps corresponding to the reference objects. Herein, the reference objects may be specific objects included in the live image which function as markers to be used for performing a process of localization of the subject vehicle to be explained later. In order to select the reference objects among general objects included in the live image, the computing device 100 may specify a subject data region whose image has been photographed as the live image, by using (i) an initial subject coordinate, which denotes an approximate location of the subject vehicle, and has been acquired through a Global Positioning System (GPS) in the subject vehicle and (ii) the information on the posture of the subject vehicle acquired through a gyro sensor in the subject vehicle. Thereafter, the computing device 100 may transmit a query to a High-Density (HD) Map by using information on the specified subject data region, and may acquire information on the reference objects and their corresponding reference feature maps, as a reply from the HD Map. In order to explain such process with an example, FIG. 3 will be referred to.

Figure 3:
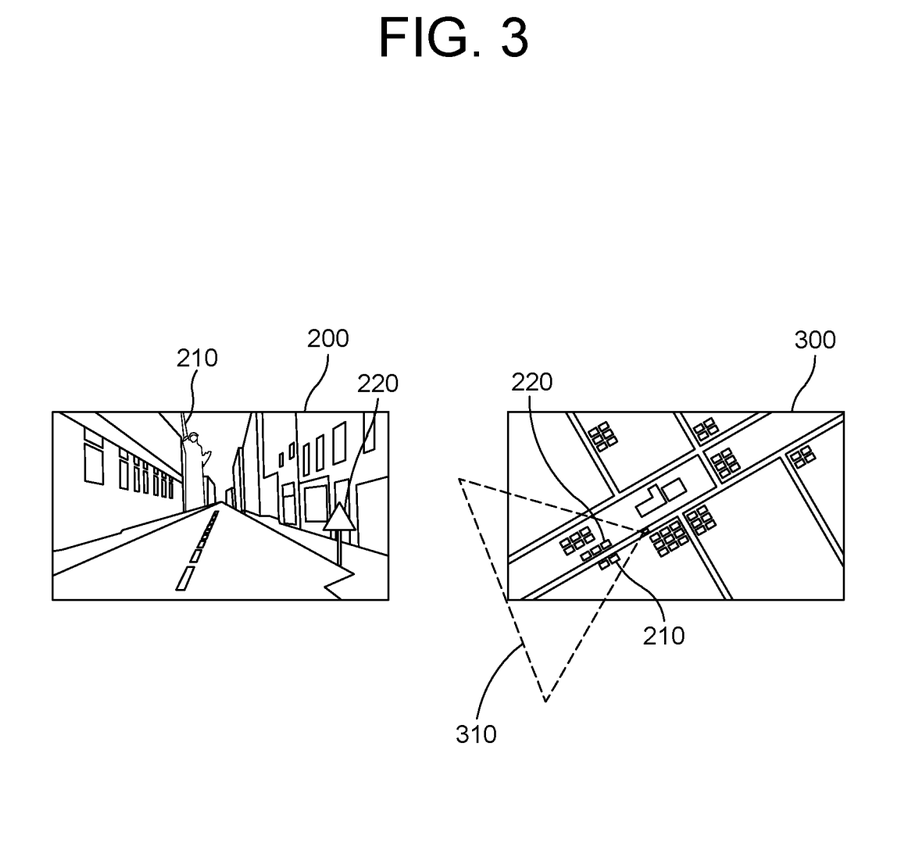
FIG. 3 is a drawing schematically illustrating an example of reference objects to be used for performing the method for acquiring the location information of the autonomous vehicle by using the attention-driven landmark detection to be used for the route planning in accordance with one example embodiment of the present disclosure.

FIG. 3 is a drawing schematically illustrating an example of reference objects to be used for performing the method for acquiring the location information of the autonomous vehicle by using the attention-driven landmark detection to be used for the route planning in accordance with one example embodiment of the present disclosure.

By referring to FIG. 3, a first reference object 210 and a second reference object 220 may be seen in the live image 200. In order to acquire information on those, the computing device 100 may specify the subject data region 310 on an example map 300 by referring to the initial subject coordinate and the information on the posture of the subject vehicle, to thereby acquire information on the first reference object 210 and the second reference object 220.

After the live feature map and the reference feature maps are acquired, the computing device 100 may detect the feature map coordinates, which represent locations of the reference objects on the live feature map. Specifically, the computing device 100 may generate a specific integrated feature map, to be used for detecting a specific feature map coordinate corresponding to a specific reference object, by channel-wise concatenating (i) a plurality of a specific reference feature map with a size of $W_2 \times H_2 \times C_2$, corresponding to the specific reference object and (ii) the live feature map with a size of $W_1 \times H_1 \times C_1$ in parallel. As an example, both of $W_2$ and $H_2$ may be 1. In this case, the specific reference feature map may be channel-wise concatenated $W_1 \times H_1$ times to the live feature map. To explain such process, FIG. 4 will be referred to.

Figure 4:
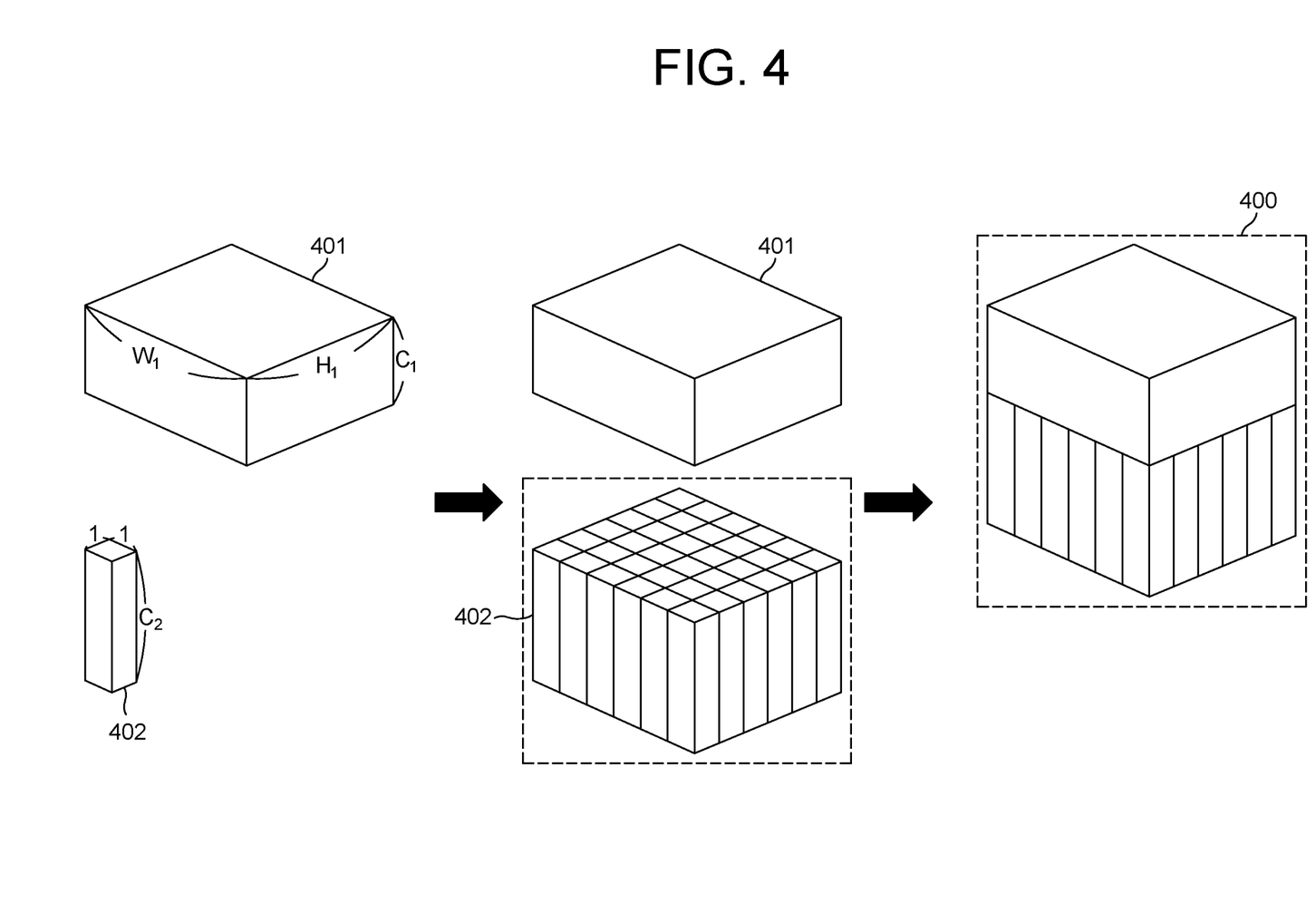
FIG. 4 is a drawing schematically illustrating a process of generating a specific integrated feature map to be used for performing the method for acquiring the location information of the autonomous vehicle by using the attention-driven landmark detection to be used for the route planning in accordance with one example embodiment of the present disclosure.

FIG. 4 is a drawing schematically illustrating a process of generating a specific integrated feature map to be used for performing the method for acquiring the location information of the autonomous vehicle by using the attention-driven landmark detection to be used for the route planning in accordance with one example embodiment of the present disclosure.

By referring to FIG. 4, it can be seen that the specific integrated feature map 400 has been generated by $W_1 \times H_1$ times channel-wise concatenating the specific reference feature map 402 to the live feature map 401. FIG. 4 corresponds to a case that a size of the specific reference feature map 402 is $1 \times 1 \times C_2$. In other cases that the size thereof is not $1 \times 1 \times C_2$, fewer number of the specific reference feature map 402 will be used for generating the specific integrated feature map.

After the specific integrated feature map is generated, as one example, the computing device 100 may apply at least one first CNN operation to the specific integrated feature map, to thereby find a specific partial live feature map, among partial live feature maps in the live feature map, whose similarity score in relation to the specific reference feature map is larger than a threshold. Herein, a size of the partial live feature maps may be smaller than the live feature map. As an example, the size thereof may be $1 \times 1 \times C_1$. The specific partial live feature map may correspond to the specific reference object, thus a location of the specific reference object in the live image can be estimated by using a relative location of the specific partial live feature map in the live feature map. That is, by using said relative location thereof, the specific feature map coordinate, among the feature map coordinates, which will be precisely processed to detect said location of the reference objects in the live image, can be detected.

The first CNN 130, which performs said first CNN operation, may include at least one convolutional layer and at least one output layer. Herein, the output layer may have been built as a Fully-Connected (FC) network. Also, the first CNN 130 may have been trained before applying the first CNN operation to the specific integrated feature map. Specifically, the first CNN may have performed (i) a process of applying the first CNN operation to an integrated feature map for training to generate each of one or more estimated similarity scores between each of one or more partial live feature maps for training in the live feature map for training and a reference feature map for training, and (ii) a process of generating a first loss by referring to the estimated similarity scores and their corresponding Ground-Truth (GT) similarity scores, and performing backpropagation by using the first loss. Such training process is similar to a general training process of a well-known Feed-Forward Neural Network, thus a person in the art may understand this easily.

As another example, the feature map coordinates may be detected by using a rule-based algorithm. That is, the relative location of the specific partial live feature map may be found not by using a sort of neural network operation, but by directly calculating the similarity scores between the partial live feature maps and the specific reference feature map.

After the feature map coordinates are acquired, the computing device 100 may detect a specific sub-region on the live image corresponding to the specific feature map coordinate. Herein, since the live feature map, including the specific partial live feature map, has been generated by down-sampling the live image multiple times through multiple convolutions applied thereto, the specific feature map "coordinate" in the live feature map corresponds to the specific sub-"region" in the live image. After the specific sub-region is detected, the computing device 100 may detect a specific sub-region coordinate of the specific reference object representing a location thereof inside the specific sub-region by referring to a specific partial integrated feature map including (i) the specific partial live feature map and (ii) its corresponding specific reference feature map.

In order to detect the specific sub-region coordinate, the computing device 100 may instruct the second CNN 140 to apply at least one second CNN operation, whose activation function is a tangent hyperbolic operation, to the specific partial integrated feature map, to thereby detect the specific sub-region coordinate. The tangent hyperbolic operation is used as the activation function in order to limit a range of the specific sub-region coordinate, i.e., from −1 to 1. The reason why the range is to be limited will be explained later.

Herein, the second CNN 140 may include at least one convolutional layer and at least one output layer. Herein, the output layer may have been built as an FC network. Also, the second CNN 140 may have been trained before applying the second CNN operation to the specific partial integrated feature map. That is, the second CNN 140 may have performed (i) a process of applying the second CNN operation to partial integrated feature maps for training to generate estimated sub-region coordinates for training of reference objects for training, and (ii) a process of generating a second loss by referring to the estimated sub-region coordinates and their corresponding Ground-Truth sub-region coordinates, and performing backpropagation by using the second loss.

After such specific sub-region coordinate is acquired, the computing device 100 may detect a specific image coordinate among the image coordinates by referring to the specific sub-region coordinate and the specific feature map coordinate. In order to explain such process, FIG. 5 will be referred to.

Figure 5:
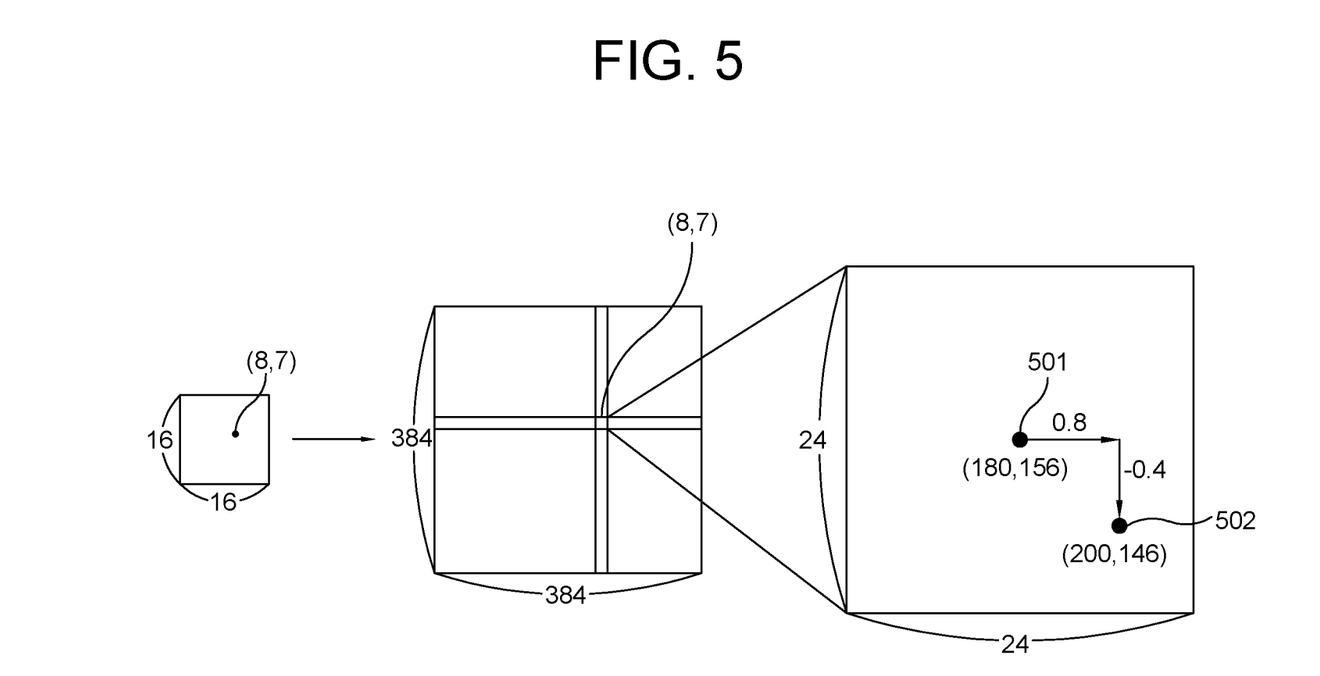
FIG. 5 is a drawing schematically illustrating a process of generating information on a specific image coordinate by using a specific sub-region coordinate to be used for performing the method for acquiring the location information of the autonomous vehicle by using the attention-driven landmark detection to be used for the route planning in accordance with one example embodiment of the present disclosure.

FIG. 5 is a drawing schematically illustrating a process of generating information on the specific image coordinate by using the specific sub-region coordinate to be used for performing the method for acquiring the location information of the autonomous vehicle by using the attention-driven landmark detection to be used for the route planning in accordance with one example embodiment of the present disclosure.

By referring to FIG. 5, a center coordinate 501 (180,156) of the specific sub-region 500 may be seen. Such coordinate may have been calculated by estimating where the specific feature map coordinate (8,7) on the live feature map with a size of 16×16 will fall in the live image with a size of 384×384. More specifically, each of points in the specific feature map becomes sub-regions with a size of 24×24. Thus, the center coordinate 501 can be calculated by multiplying 24 to the specific feature map coordinate and then subtracting 12 from the multiplied coordinate. Also, the specific sub-region coordinate 502 (0.8,−0.4), which has been calculated as included in said range corresponding to the tangent hyperbolic operation, can be seen. Herein, the specific image coordinate may be calculated as [180+0.8× 24,156+(−0.4)×24]≈(200,146), since the specific sub-region coordinate is a vector representing a direction from the center coordinate 501 to the specific reference object in the specific sub-region as seen in the Figure. Such process may be generalized as following formula:

Specific Image Coordinate=$(x_1 \times (w-0.5) + x_2 w, y_1 \times (h-0.5) + y_2 h)$ Herein, $(x_1, y_1)$ may denote the specific feature map coordinate, $(x_2, y_2)$ may denote the specific sub-region coordinate, and w×h may denote the size of the specific sub-region. Also, the size of the specific sub-region may be determined by referring to a stride used for generating the live feature map, corresponding to a ratio of the size of the live image and that of the live feature map.

So far numerical examples of the coordinates shown above have been shown under an assumption that original points for the coordinates are leftmost points among points at bottoms of the live image and the live feature map, but those can be set as centers of the live image and the live feature map as the case may be.

After each of the image coordinates is acquired by performing said processes, the computing device 100 may use the image coordinates along with other information to detect the optimized subject coordinate of the subject vehicle in the real world. Said other information may include the 3-dimensional coordinates of the reference objects in the real world, the image coordinates, the information on the parameters of the camera which has photographed the live image, and the information on the posture of the subject vehicle. Herein, the 3-dimensional coordinates may have been acquired along with the reference feature maps from the HD Map. Below, the process of detecting the optimized subject coordinate will be explained specifically with a formula.

$$\min_{\theta, R, Z} \left\| \begin{bmatrix} [p_1]_1 & \cdots & [p_n]_1 \\ [p_1]_2 & \cdots & [p_n]_2 \\ 1 & \cdots & 1 \end{bmatrix} \begin{bmatrix} z_1 & 0 & 0 \\ 0 & \ddots & 0 \\ 0 & 0 & z_n \end{bmatrix} - K \times R(\theta) \left( \begin{bmatrix} [q_1]_1 & \cdots & [q_n]_1 \\ [q_1]_2 & \cdots & [q_n]_2 \\ [q_1]_3 & \cdots & [q_n]_3 \end{bmatrix} - \begin{bmatrix} r_1 & \cdots & r_1 \\ r_2 & \cdots & r_2 \\ r_3 & \cdots & r_3 \end{bmatrix} \right) \right\|$$

Herein, $[p_j]_k$ may denote a k-th axis component of a j-th image coordinate of a j-th reference object, and $[q_j]_k$ may denote a k-th axis component of a j-th 3-dimensional coordinate of the j-th reference object. Also, $r_k$ may denote a k-th axis component of the optimized subject coordinate, and $z_k$ may denote a k-th diagonal component of a diagonal matrix including arbitrary numbers as its diagonal components. And, K may denote a camera matrix corresponding to the parameters of the camera, $R(\theta)$ may denote a rotation matrix corresponding to the posture of the subject vehicle. The rotation matrix may be a matrix used for the Rodrigues Rotation Formula, which is a well-known prior art. And, the camera matrix may be a matrix for transforming a coordinate on a 2-dimensional image to a coordinate in a 3 dimensional space, which is well-known in the field of the image processing. As an example, each of components in one of the 3-dimensional coordinates may denote each of a latitude, a longitude and an altitude of its corresponding reference object.

More specifically, the formula may represent an optimization problem, and the computing device 100 may solve the optimization problem, to thereby detect the optimized subject coordinate. However, if the optimization problem is solved starting from random initial values, it may not be solved properly. That is, the computing device 100 may only find local minima, or may fail to solve it due to too much requirement for computing resources. In order to prevent such risk, a proper initialization process is necessary. Below, it will be explained more specifically.

First, the computing device 100 may perform (i) a process of initializing the rotation matrix by referring to the information on the posture which has been acquired through at least one gyro sensor in the subject vehicle, to thereby generate an initialized rotation matrix, and (ii) a process of initializing a subject coordinate matrix, to be used for acquiring the optimized subject coordinate, by referring to an initial subject coordinate acquired through the GPS in the subject vehicle, to thereby generate an initialized subject coordinate matrix. The rotation matrix may be initialized as shown above under an assumption that the information on the posture acquired through the gyro sensor is quite accurate. Also, the subject coordinate matrix may be initialized as shown above in order to adjust the location information acquired form the GPS, which may be slightly incorrect.

On condition that the initialized rotation matrix and the initialized matrix are provided, the computing device 100 may perform a process of initializing the diagonal matrix by finding an initialized diagonal matrix which minimizes said formula.

Thereafter, the computing device 100 may finally perform a process of finding an optimized rotation matrix, an optimized subject coordinate matrix and an optimized diagonal matrix which minimize said formula by adjusting values of the initialized rotation matrix, the initialized subject coordinate matrix and the initialized diagonal matrix, to thereby solve the optimization problem, and then to thereby find the optimized subject coordinate by referring to the optimized subject coordinate matrix.

In summary, the optimization problem is directed to a method for adjusting the initial subject coordinate of the subject vehicle based on the GPS by using the image coordinates of the reference objects based on the live image. A person in the art may easily understand the method of the present disclosure by referring to above explanation.

After the optimized subject coordinate is acquired, the subject vehicle may become capable of performing the autonomous driving with more accurate location information of itself.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for detecting a location of a subject vehicle capable of an autonomous driving by using a landmark detection, comprising steps of:
   (a) a computing device, if at least one live feature map, which has been generated by processing at least one live image corresponding to a circumstance of the subject vehicle interworking with the computing device, is acquired, detecting each of feature map coordinates on the live feature map per each of one or more reference objects included in a subject data region corresponding to at least one location and at least one posture of the subject vehicle by which the live feature map has been acquired, by referring to (i) each of one or more reference feature maps corresponding to each of the reference objects, and (ii) the live feature map;
   (b) the computing device detecting each of image coordinates of each of the reference objects on the live image by referring to each of the feature map coordinates; and
   (c) the computing device detecting at least one optimized subject coordinate of the subject vehicle by referring to one or more 3-dimensional coordinates of the reference objects in a real world, the image coordinates, information on parameters of a camera which has acquired the live image, and information on said posture of the subject vehicle.

2. The method of claim 1, wherein, at the step of (c), the computing device detects the optimized subject coordinate by using a following formula, along with the image coordinates, the 3-dimensional coordinates, the information on the parameters and the information on the posture:

$$\min_{\theta, R, Z} \left\| \begin{bmatrix} [p_1]_1 & \cdots & [p_n]_1 \\ [p_1]_2 & \cdots & [p_n]_2 \\ 1 & \cdots & 1 \end{bmatrix} \begin{bmatrix} z_1 & 0 & 0 \\ 0 & \ddots & 0 \\ 0 & 0 & z_n \end{bmatrix} - K \times R(\theta) \left( \begin{bmatrix} [q_1]_1 & \cdots & [q_n]_1 \\ [q_1]_2 & \cdots & [q_n]_2 \\ [q_1]_3 & \cdots & [q_n]_3 \end{bmatrix} - \begin{bmatrix} r_1 & \cdots & r_1 \\ r_2 & \cdots & r_2 \\ r_3 & \cdots & r_3 \end{bmatrix} \right) \right\|$$

wherein $[p_j]_k$ denotes a k-th axis component of a j-th image coordinate of a j-th reference object, $[q_j]_k$ denotes a k-th axis component of a j-th 3-dimensional coordinate of the j-th reference object, $r_k$ denotes a k-th axis component of the optimized subject coordinate, $z_k$ denotes a k-th diagonal component of a diagonal matrix including arbitrary numbers as its diagonal components, K denotes a camera matrix corresponding to the parameters of the camera, $R(\theta)$ denotes a rotation matrix corresponding to the posture of the subject vehicle.

3. The method of claim 2, wherein, at the step of (c), the computing device detects the optimized subject coordinate by solving an optimization problem corresponding to said formula,
   wherein the computing device (i) first performs (i-1) a process of initializing the rotation matrix by referring to the information on the posture which has been acquired through at least one gyro sensor in the subject vehicle, to thereby generate an initialized rotation matrix, and (i-2) a process of initializing a subject coordinate matrix, to be used for acquiring the optimized subject coordinate, by referring to an initial subject coordinate acquired through a Global Positioning System (GPS) in the subject vehicle, to thereby generate an initialized subject coordinate matrix, (ii) then performs a process of initializing the diagonal matrix by finding an initialized diagonal matrix which minimizes said formula on condition that the initialized rotation matrix and the initialized subject coordinate matrix are provided, and (iii) finally performs a process of finding an optimized rotation matrix, an optimized subject coordinate matrix and an optimized diagonal matrix which minimize said formula by adjusting values of the initialized rotation matrix, the initialized subject coordinate matrix and the initialized diagonal matrix, to thereby solve the optimization problem, and then to thereby find the optimized subject coordinate by referring to the optimized subject coordinate matrix.

4. The method of claim 1, wherein, at the step of (a), the computing device, if a specific integrated feature map, which has been generated by channel-wise concatenating (i) a plurality of a specific reference feature map with a size of $W_2 \times H_2 \times C_2$, corresponding to a specific reference object and (ii) the live feature map with a size of $W_1 \times H_1 \times C_1$ in parallel, is acquired, instructs a first Convolutional Neural Network (CNN) to apply at least one first CNN operation to the specific integrated feature map, to thereby find a specific partial live feature map, among partial live feature maps in the live feature map, whose similarity score in relation to the specific reference feature map is larger than a threshold, and then to thereby detect a specific feature map coordinate among the feature map coordinates by referring to information on a relative location of the specific partial live feature map in the live feature map.

5. The method of claim 4, wherein the first CNN has been trained before applying the first CNN operation to the specific integrated feature map,
   wherein the first CNN has performed (i) a process of applying the first CNN operation to an integrated feature map for training to generate each of one or more estimated similarity scores between each of one or more partial live feature maps for training in the live feature map for training and a reference feature map for training, and (ii) a process of generating a first loss by referring to the estimated similarity scores and their corresponding Ground-Truth (GT) similarity scores, and performing backpropagation by using the first loss.

6. The method of claim 1, wherein, at the step of (b), the computing device (i) detects a specific sub-region coordinate of a specific reference object on a specific sub-region, corresponding to a specific feature map coordinate, in the live image by referring to a specific partial integrated feature map, which has been generated by integrating (i-1) a specific partial live feature map corresponding to the specific feature map coordinate and (i-2) a specific reference feature map corresponding thereto, and (ii) detects a specific image coordinate among the image coordinates by referring to the specific sub-region coordinate and the specific feature map coordinate.

7. The method of claim 6, wherein, at the step of (b), the computing device instructs a second CNN to apply at least one second CNN operation, whose activation function is a tangent hyperbolic operation, to the specific partial integrated feature map, to thereby detect the specific sub-region coordinate.

8. The method of claim 7, wherein the second CNN has been trained before applying the second CNN operation to the specific partial integrated feature map,
   wherein the second CNN has performed (i) a process of applying the second CNN operation to partial integrated feature maps for training to generate estimated sub-region coordinates for training of reference objects for training corresponding to the partial integrated feature maps for training, and (ii) a process of generating a second loss by referring to the estimated sub-region coordinates and their corresponding Ground-Truth sub-region coordinates, and performing backpropagation by using the second loss.

9. The method of claim 1, wherein, at the step of (a), after the live image is acquired through the camera in the subject vehicle, the live image is delivered to an autonomous driving module to generate the live feature map while the autonomous driving module performs an autonomous driving of the subject vehicle, and then the live feature map is delivered to the computing device.

10. The method of claim 1, wherein, at the step of (a), the computing device transmits a query to a High-Density (HD) Map by using an initial subject coordinate acquired through a GPS in the subject vehicle and the information on the posture of the subject vehicle, to thereby acquire information on the subject data region including the reference feature maps.

11. A device for detecting a location of a subject vehicle capable of an autonomous driving by using a landmark detection, comprising:
   at least one memory that stores instructions; and
   at least one processor configured to execute the instructions to perform processes of: (I) if at least one live feature map, which has been generated by processing at least one live image corresponding to a circumstance of the subject vehicle interworking with the computing device, is acquired, detecting each of feature map coordinates on the live feature map per each of one or more reference objects included in a subject data region corresponding to at least one location and at least one posture of the subject vehicle by which the live feature map has been acquired, by referring to (i) each of one or more reference feature maps corresponding to each of the reference objects, and (ii) the live feature map; (II) detecting each of image coordinates of each of the reference objects on the live image by referring to each of the feature map coordinates; and (III) detecting at least one optimized subject coordinate of the subject vehicle by referring to one or more 3-dimensional coordinates of the reference objects in a real world, the image coordinates, information on parameters of a camera which has acquired the live image, and information on said posture of the subject vehicle.

12. The device of claim 11, wherein, at the process of (III), the processor detects the optimized subject coordinate by using a following formula, along with the image coordinates, the 3-dimensional coordinates, the information on the parameters and the information on the posture:

$$\min_{\theta, R, Z} \left\| \begin{bmatrix} [p_1]_1 & \cdots & [p_n]_1 \\ [p_1]_2 & \cdots & [p_n]_2 \\ 1 & \cdots & 1 \end{bmatrix} \begin{bmatrix} z_1 & 0 & 0 \\ 0 & \ddots & 0 \\ 0 & 0 & z_n \end{bmatrix} - K \times R(\theta) \left( \begin{bmatrix} [q_1]_1 & \cdots & [q_n]_1 \\ [q_1]_2 & \cdots & [q_n]_2 \\ [q_1]_3 & \cdots & [q_n]_3 \end{bmatrix} - \begin{bmatrix} r_1 & \cdots & r_1 \\ r_2 & \cdots & r_2 \\ r_3 & \cdots & r_3 \end{bmatrix} \right) \right\|$$

wherein $[p_j]_k$ denotes a k-th axis component of a j-th image coordinate of a j-th reference object, $[q_j]_k$ denotes a k-th axis component of a j-th 3-dimensional coordinate of the j-th reference object, $r_k$ denotes a k-th axis component of the optimized subject coordinate, $z_k$ denotes a k-th diagonal component of a diagonal matrix including arbitrary numbers as its diagonal components, K denotes a camera matrix corresponding to the parameters of the camera, $R(\theta)$ denotes a rotation matrix corresponding to the posture of the subject vehicle.

13. The device of claim 12, wherein, at the process of (III), the processor detects the optimized subject coordinate by solving an optimization problem corresponding to said formula,
   wherein the processor (i) first performs (i-1) a process of initializing the rotation matrix by referring to the information on the posture which has been acquired through at least one gyro sensor in the subject vehicle, to thereby generate an initialized rotation matrix, and (i-2) a process of initializing a subject coordinate matrix, to be used for acquiring the optimized subject coordinate, by referring to an initial subject coordinate acquired through a Global Positioning System (GPS) in the subject vehicle, to thereby generate an initialized subject coordinate matrix, (ii) then performs a process of initializing the diagonal matrix by finding an initialized diagonal matrix which minimizes said formula on condition that the initialized rotation matrix and the initialized subject coordinate matrix are provided, and (iii) finally performs a process of finding an optimized rotation matrix, an optimized subject coordinate matrix and an optimized diagonal matrix which minimize said formula by adjusting values of the initialized rotation matrix, the initialized subject coordinate matrix and the initialized diagonal matrix, to thereby solve the optimization problem, and then to thereby find the optimized subject coordinate by referring to the optimized subject coordinate matrix.

14. The device of claim 11, wherein, at the process of (I), the processor, if a specific integrated feature map, which has been generated by channel-wise concatenating (i) a plurality of a specific reference feature map with a size of $W_2 \times H_2 \times C_2$, corresponding to a specific reference object and (ii) the live feature map with a size of $W_1 \times H_1 \times C_1$ in parallel, is acquired, instructs a first Convolutional Neural Network (CNN) to apply at least one first CNN operation to the specific integrated feature map, to thereby find a specific partial live feature map, among partial live feature maps in the live feature map, whose similarity score in relation to the specific reference feature map is larger than a threshold, and then to thereby detect a specific feature map coordinate among the feature map coordinates by referring to information on a relative location of the specific partial live feature map in the live feature map.

15. The device of claim 14, wherein the first CNN has been trained before applying the first CNN operation to the specific integrated feature map,
wherein the first CNN has performed (i) a process of applying the first CNN operation to an integrated feature map for training to generate each of one or more estimated similarity scores between each of one or more partial live feature maps for training in the live feature map for training and a reference feature map for training, and (ii) a process of generating a first loss by referring to the estimated similarity scores and their corresponding Ground-Truth (GT) similarity scores, and performing backpropagation by using the first loss.

16. The device of claim 11, wherein, at the process of (II), the processor (i) detects a specific sub-region coordinate of a specific reference object on a specific sub-region, corresponding to a specific feature map coordinate, in the live image by referring to a specific partial integrated feature map, which has been generated by integrating (i-1) a specific partial live feature map corresponding to the specific feature map coordinate and (i-2) a specific reference feature map corresponding thereto, and (ii) detects a specific image coordinate among the image coordinates by referring to the specific sub-region coordinate and the specific feature map coordinate.

17. The device of claim 16, wherein, at the process of (II), the processor instructs a second CNN to apply at least one second CNN operation, whose activation function is a tangent hyperbolic operation, to the specific partial integrated feature map, to thereby detect the specific sub-region coordinate.

18. The device of claim 17, wherein the second CNN has been trained before applying the second CNN operation to the specific partial integrated feature map,
wherein the second CNN has performed (i) a process of applying the second CNN operation to partial integrated feature maps for training to generate estimated sub-region coordinates for training of reference objects for training corresponding to the partial integrated feature maps for training, and (ii) a process of generating a second loss by referring to the estimated sub-region coordinates and their corresponding Ground-Truth sub-region coordinates, and performing backpropagation by using the second loss.

19. The device of claim 11, wherein, at the process of (I), after the live image is acquired through the camera in the subject vehicle, the live image is delivered to an autonomous driving module to generate the live feature map while the autonomous driving module performs an autonomous driving of the subject vehicle, and then the live feature map is delivered to the computing device.

20. The device of claim 11, wherein, at the process of (I), the processor transmits a query to a High-Density (HD) Map by using an initial subject coordinate acquired through a GPS in the subject vehicle and the information on the posture of the subject vehicle, to thereby acquire information on the subject data region including the reference feature maps.

* * * * *